United States Patent
Song

(10) Patent No.: US 9,615,077 B2
(45) Date of Patent: Apr. 4, 2017

(54) DISPLAY APPARATUS AND A METHOD OF DRIVING THE SAME

(75) Inventor: JangKun Song, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 519 days.

(21) Appl. No.: 13/413,985

(22) Filed: Mar. 7, 2012

(65) Prior Publication Data

US 2013/0063422 A1 Mar. 14, 2013

(30) Foreign Application Priority Data

Sep. 9, 2011 (KR) .................... 10-2011-0091675

(51) Int. Cl.
| | | |
|---|---|---|
| H04N 13/00 | (2006.01) | |
| G06T 15/00 | (2011.01) | |
| G09G 5/00 | (2006.01) | |
| G09G 3/36 | (2006.01) | |
| H04N 13/04 | (2006.01) | |

(52) U.S. Cl.
CPC ..... *H04N 13/0029* (2013.01); *H04N 13/0033* (2013.01); *H04N 13/0438* (2013.01)

(58) Field of Classification Search
CPC ........ G06T 15/00; H04N 13/02; H04N 13/04; H04N 13/0029; H04N 13/0033; H04N 13/00; G09G 3/36; G09G 5/00; G09G 5/10; G09G 2340/16; G09G 2320/0209; G09G 2340/0435
USPC ................. 345/87, 419, 690; 348/46, 51
See application file for complete search history.

(56) References Cited

U.S. PATENT DOCUMENTS

| | | | |
|---|---|---|---|
| 2007/0126758 A1* | 6/2007 | Hwang | 345/690 |
| 2008/0079675 A1* | 4/2008 | Yang et al. | 345/87 |
| 2011/0273439 A1* | 11/2011 | Son et al. | 345/419 |
| 2012/0086706 A1* | 4/2012 | Lee et al. | 345/419 |
| 2012/0300036 A1* | 11/2012 | Flynn | 348/46 |
| 2013/0038704 A1* | 2/2013 | Hirata et al. | 348/51 |

FOREIGN PATENT DOCUMENTS

| | | |
|---|---|---|
| JP | 2010-217311 | 9/2010 |
| JP | 2010-282089 | 12/2010 |
| KR | 1020100032284 | 3/2010 |

* cited by examiner

*Primary Examiner* — Jorge L Ortiz-Criado
*Assistant Examiner* — Albert Kir
(74) *Attorney, Agent, or Firm* — F.Chau & Associates, LLC

(57) ABSTRACT

A display device includes a display panel including pixels, a frame rate convertor to separate an input image signal into left and right-eye image signals and output the left-eye image signal as first and second left-eye image signals and the right-eye image signal as first and second right-eye image signals, a timing controller to convert the first and second left-eye image signals into first and second left-eye output image signals according to locations of the display panel where the first and second left-eye image signals are displayed and the first and second right-eye image signals into first and second right-eye output image signals according to locations of the display panel where the first and second right-eye image signals are displayed, and a data driver to drive the pixels in response to the first and second left-eye output image signals and the first and second right-eye output image signals.

19 Claims, 10 Drawing Sheets

DISPLAY APPARATUS AND A METHOD OF DRIVING THE SAME

CROSS-REFERENCE TO RELATED APPLICATION

This application claims priority under 35 U.S.C §119 to Korean Patent Application No. 10-2011-0091675 filed on Sep. 9, 2011, the disclosure of which is incorporated by reference herein in its entirety.

TECHNICAL FIELD

The present inventive concept relates to a display device and a driving method thereof, and more particularly, to a display device and a driving method capable of improving a display quality of the display device.

DISCUSSION OF THE RELATED ART

A three-dimensional (3D) image display device enables a user to see a 3D image by displaying two-dimensional (2D) images respectively intended for the left and right eyes of the user, for example. Due to binocular parallax, which occurs because a person's eyes are spaced apart from each other, the user's brain blends the left and right eye images together to obtain a 3D effect.

The 3D image display device may be classified as a glasses-based (e.g., stereoscopic) 3D image display device and a non-glasses-based (e.g., autostereoscopic) 3D image display device. The glasses-based 3D image display device may be divided into a polarization glasses-based 3D image display device and a shutter glasses-based 3D image display device. The shutter glasses-based 3D image display device may separately and continuously output an image for the left eye and an image for the right eye from a display panel to a pair of shutter glasses to produce a 3D image.

In the shutter glasses-based 3D image display device, when an image displayed at the display panel is switched from the right eye image to the left eye image or vice versa, the images for the left and right eyes may be mixed due to a scanning method of the display panel. This may cause the quality of the 3D image to be lowered. Accordingly, there is a need to improve the quality of a 3D image.

SUMMARY

An exemplary embodiment of the inventive concept provides a display device which comprises a display panel including a plurality of pixels; a frame rate convertor configured to separate an input image signal into a left-eye image signal and a right-eye image signal, output the left-eye image signal as first and second left-eye image signals and output the right-eye image signal as first and second right-eye image signals; a timing controller configured to convert the first left-eye image signal into a first left-eye output image signal according to a location of the display panel where the first left-eye image signal is to be displayed, convert the second left-eye image signal into a second left-eye output image signal according to a location of the display panel where the second left-eye image signal is to be displayed, convert the first right-eye image signal into a first right-eye output image signal according to a location of the display panel where the first right-eye image signal is to be displayed and convert the second right-eye output image signal according to a location of the display panel where the second right-eye image signal is to be displayed; and a data driver configured to drive the pixels in response to the first and second left-eye output image signals and the first and second right-eye output image signals.

In an exemplary embodiment of the inventive concept, the timing controller converts the first and second left-eye image signals into the first and second left-eye output image signals by changing gray scale values of the first and second left-eye image signals to respectively correspond to the location of the display panel where the first and second left-eye image signals are to be displayed, and converts the first and second right-eye image signals into the first and second right-eye output image signals by changing gray scale values of the first and second right-eye image signals to respectively correspond to the location of the display panel where the first and second right-eye image signals are to be displayed.

In an exemplary embodiment of the inventive concept, the timing controller comprises a first lookup table configured to store the gray scale values corresponding to the locations of the display panel where the first left-eye and right-eye image signals are to be displayed; a second lookup table configured to store the gray scale values corresponding to the locations of the display panel where the second left-eye and right-eye image signals are to be displayed; and a data converting unit configured to convert the first and second left-eye image signals into the first and second left-eye output image signals and the first and second right-eye image signals into the first and second right-eye output image signals by using the first and second lookup tables.

In an exemplary embodiment of the inventive concept, the locations of the display panel where the first left-eye and right-eye image signals are to be displayed and the second left-eye and right-eye image signals are to be displayed are rows.

In an exemplary embodiment of the inventive concept, the gray scale values of the first left-eye and right-eye image signals are smaller than a gray scale value of the input image signal when the location of the display panel where the first left-eye and right-eye image signals are to be displayed is a higher row than a first reference row, and the gray scale values of the first left-eye and right-eye image signals are larger than the gray scale value of the input image signal when the location of the display panel where the first left-eye and right-eye image signals are to be displayed is a lower row than the first reference row.

In an exemplary embodiment of the inventive concept, the gray scale values of the second left-eye and right-eye image signals are larger than a gray scale value of the input image signal when the location of the display panel where the second left-eye and right-eye image signals are to be displayed is a higher row than a second reference row, and the gray scales of the second left-eye and right-eye image signals are smaller than a gray scale of the input image signal when the location of the display panel where the second left-eye and right-eye image signals are to be displayed is a lower row than the second reference row.

In an exemplary embodiment of the inventive concept, the frame rate convertor separates the input image signal into a left-eye signal and a right-eye signal and performs a resolution-based adjustment to generate the left-eye image signal and the right-eye image signal.

In an exemplary embodiment of the inventive concept, a frequency of each of the first and second left-eye image signals and the first and second right-eye image signals output from the frame rate convertor is higher than a frequency of the input image signal.

In an exemplary embodiment of the inventive concept, the frequency of each of the first and second left-eye image signals and the first and second right-eye image signals output from the frame rate convertor is four times higher than the frequency of the input image signal.

An exemplary embodiment of the inventive concept provides a display device which comprises a display panel including a plurality of pixels; a frame rate convertor configured to convert an input image signal into first and second left-eye output image signals and first and second right-eye output image signals according to a location of the display panel where the input image signal is to be displayed; and a data driver configured to drive the pixels in response to the first and second left-eye output image signals and the first and second right-eye output image signals.

In an exemplary embodiment of the inventive concept, the frame rate convertor converts the input image signal into the first and second left-eye output image signals and the first and second right-eye output image signals by using gray scales of the input image signal corresponding to rows of the display panel where the input image signal is to be displayed.

In an exemplary embodiment of the inventive concept, the rows of the display panel increase in a first direction, and the gray scale values of the input image signal corresponding to the first left-eye and right-eye output image signals increase as the rows increase.

In an exemplary embodiment of the inventive concept, the rows of the display panel increases in the first direction, and the gray scale values of the input image signal corresponding to the second left-eye and right-eye image signals decrease as the rows increase.

In an exemplary embodiment of the inventive concept, the frame rate convertor comprises a data splitting unit configured to convert the input image signal into a left-eye signal and a right-eye signal; a scaler configured to convert the left-eye and right-eye signals into left-eye and right-eye image signals depending on a resolution of the display panel; and a frame converting unit configured to convert the left-eye image signal into the first and second left-eye output image signals by using gray scale values of the left-eye image signal corresponding to a location of the display panel where the left-eye image signal is to be displayed and the right-eye image signal into the first and second right-eye output image signals by using gray scale values of the right-eye image signal corresponding to a location of the display panel where the right-eye image signal is to be displayed In an exemplary embodiment of the inventive concept, the frame rate convertor further comprises a first lookup table configured to store the gray scale value of the location of the display panel where the left-eye image signal is to be displayed for use in generating the first left-eye output image signal and the gray scale value of the location of the display panel where the right-eye image signal is to be displayed for use in generating the first right-eye output image signal; and a second lookup table configured to store the gray scale value of the location of the display panel where the left-eye image signal is to be displayed for use in generating the second left-eye output image signal and the gray scale value of the location of the display panel where the right-eye image signal is to be displayed for use in generating the second right-eye output image signal. The frame converting unit converts the left-eye image signal into the first and second left-eye output image signals and the right-eye image signal into the first and second right-eye output image signals by using the first and second lookup tables.

In an exemplary embodiment of the inventive concept, a frequency of each of the first and second left-eye output image signals and the first and second right-eye output image signals output from the frame rate convertor is higher than a frequency of the input image signal.

In an exemplary embodiment of the inventive concept, the frequency of each of the first and second left-eye output image signals and the first and second right-eye output image signals output from the frame rate convertor is four times higher than the frequency of the input image signal.

In an exemplary embodiment of the inventive concept, the frame rate convertor sequentially outputs the first and second left-eye output image signals and the first and second right-eye output image signals in response to the input image signal.

In an exemplary embodiment of the inventive concept, the frame rate convertor sequentially outputs the first and second right-eye output image signals and the first and second left-eye output image signals in response to the input image signal.

An exemplary embodiment of the inventive concept provides a frame rate convertor configured to receive an image data signal, split the image data signal into left and right-eye signals in response to a 3D enable signal, adjust the left and right-eye signals according to a display resolution, in response to the adjusted left-eye signal, generate first and second left-eye image signals and, in response to the adjusted right-eye signal, generate first and second right-eye image signals; and a timing controller configured to convert the first and second left-eye image signals into first and second left-eye output image signals and the first and second right-eye image signals into first and second right-eye output image signals by using differing gray scale values of the image data signal.

BRIEF DESCRIPTION OF THE DRAWINGS

The above and other features of the present inventive concept will become more apparent by describing in detail exemplary embodiments thereof with reference to the accompanying drawings.

DETAILED DESCRIPTION OF EXEMPLARY EMBODIMENTS

Exemplary embodiments of the present inventive concept will be described more fully hereinafter with reference to the accompanying drawings. However, the present inventive concept may be embodied in various different ways and should not be construed as limited to the exemplary embodiments described herein.

It will be understood that when an element or layer is referred to as being "on," "connected to" or "coupled to" another element or layer, it can be directly on, connected or coupled to the other element or layer or intervening elements or layers may be present. Like numbers may refer to like elements throughout the specification and drawings.

As used herein, the singular forms, "a," "an" and "the" are intended to include the plural forms as well, unless the context clearly indicates otherwise.

Figure 1:
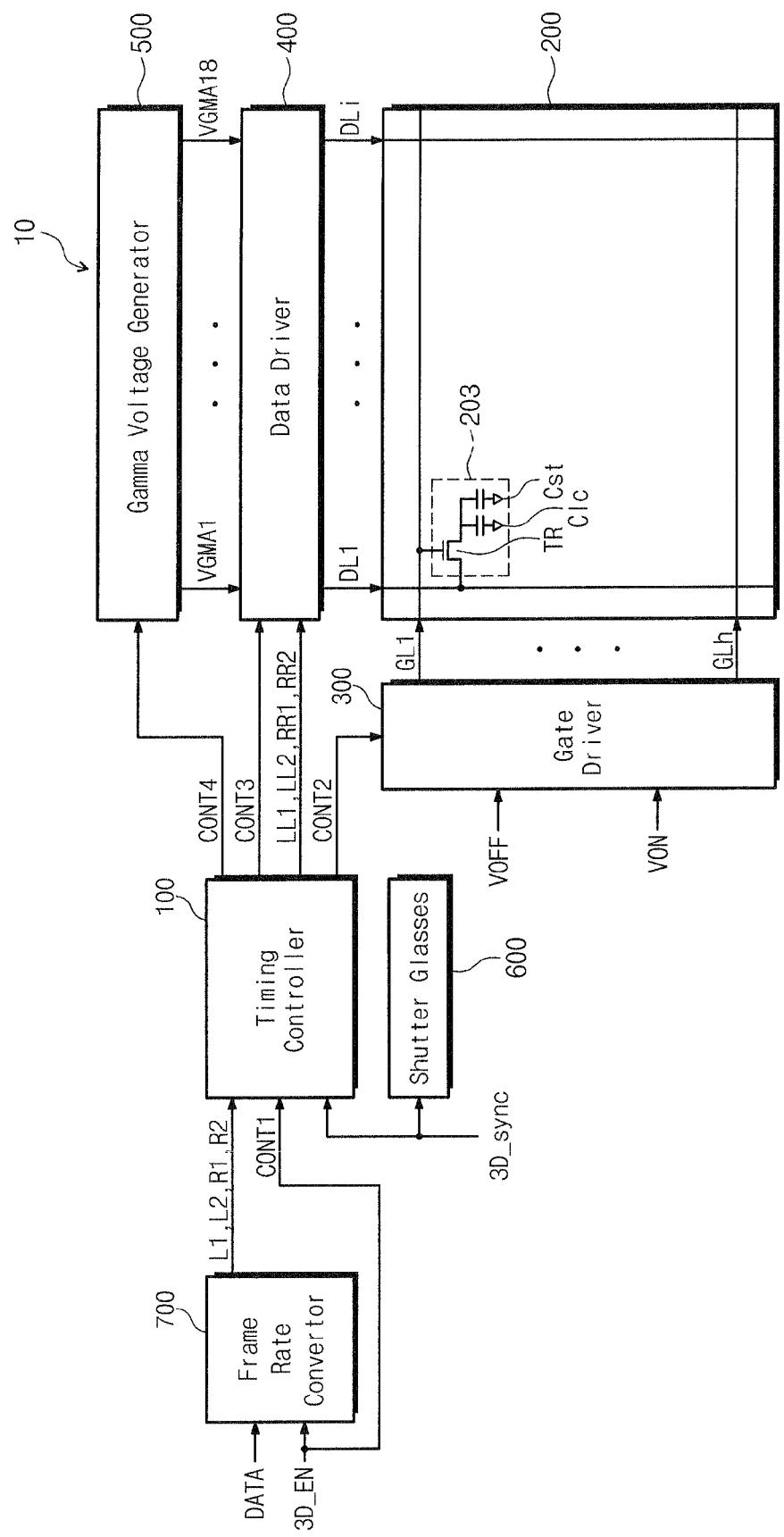
FIG. 1 is a block diagram illustrating a display device according to an exemplary embodiment of the inventive concept.

FIG. 1 is a block diagram illustrating a display device according to an exemplary embodiment of the inventive concept.

Referring to FIG. 1, a display device 10 may include a display panel 200 for displaying images, gate and data drivers 300 and 400 for driving the display panel 200, a gamma voltage generator 500 connected to the data driver 400, a timing controller 100 for controlling the gate driver 300 and the data driver 400, a frame rate convertor 700, and shutter glasses 600.

The display panel 200 may receive data voltages from the data driver 400 and gate signals from the gate driver 300 to display images in response to the gate signals.

The display panel 200 may include a plurality of gate lines GL1 through GLh supplied with the gate signals and a plurality of data lines DL1 through DLi supplied with the data voltages. The display panel 200 may further include a plurality of pixels 203 arranged in a matrix form, and each of the pixels 203 may be formed of a thin film transistor TR, a liquid crystal capacitor Clc, and a storage capacitor Cst.

Since the pixels 203 may have the same structure, the structure of one pixel will now be described.

The thin film transistor TR of the pixel 203 may have a gate electrode connected with a first gate line GL1 of the gate lines GL1 through GLh, a data electrode connected with a first data line DL1 of the data lines DL1 through DLi, and a drain electrode connected with the liquid crystal capacitor Clc and the storage capacitor Cst. The liquid crystal capacitor Clc and the storage capacitor Cst may be connected in parallel to the drain electrode of the thin film transistor TR.

The liquid crystal capacitor Clc may be formed of a pixel electrode, a common electrode opposite to the pixel electrode, and a liquid crystal layer interposed between the pixel electrode and the common electrode. In this case, the drain electrode of the thin film transistor TR may be electrically connected to the pixel electrode of the liquid crystal capacitor Clc. A data voltage output from the thin film transistor TR may be supplied to the pixel electrode. The common electrode may receive a reference voltage. The liquid crystal capacitor Clc may charge a voltage corresponding to a potential difference between the data voltage and the reference voltage.

Although not shown in FIG. 1, the display panel 200 may include a first display substrate, a second display substrate opposite to the first display substrate, and a liquid crystal layer interposed between the first display substrate and the second display substrate.

In an exemplary embodiment of the inventive concept, the pixel electrode may be provided at the first display substrate, the common electrode may be provided at the second display substrate, and the pixel and common electrodes may be opposite to each other with the liquid crystal layer interposed therebetween. In an exemplary embodiment of the inventive concept, the pixel and common electrodes can both be provided at one of the first and second display substrates. The frame rate convertor 700 may divide an input image signal DATA provided from a video system (not shown) into an image signal for the left eye (hereinafter, referred to as a left-eye image signal) and an image signal for the right eye (hereinafter, referred to as a right-eye image signal), and may output the left-eye image signal as a first left-eye image signal L1 and a second left-eye image signal L2 and the right-eye image signal as a first right-eye image signal R1 and a second right-eye image signal R2. The frame rate convertor 700 may sequentially output the first left-eye image signal L1, the second left-eye image signal L2, the first right-eye image signal R1, and the second right-eye image signal R2 in response to a frame of the input image signal DATA.

In the event that a frequency of the input image signal DATA is 60 Hz, each of the first left-eye image signal L1, the second left-eye image signal L2, the first right-eye image signal R1, and the second right-eye image signal R2 output from the frame rate convertor 700 may have a frequency of 240 Hz. In other words, the frame rate convertor 700 may receive a frame of an input image signal DATA and sequentially output four frames of image signals L1, L2, R1, and R2 at a rate four times that of the input image signal DATA. Each of the first left-eye image signal L1, the second left-eye image signal L2, the first right-eye image signal R1, and the second right-eye image signal R2 output from the frame rate convertor 700 may have a frequency (e.g., 120 Hz, 360 Hz, etc.) other than 240 Hz.

The timing controller 100 may receive the first left-eye image signal L1, the second left-eye image signal L2, the first right-eye image signal R1, and the second right-eye image signal R2 from the frame rate convertor 700 and a control signal CONT1 from an external device. The timing controller 100 may compensate the first and second left-eye image signals L1 and L2 and the first and second right-eye image signals R1 and R2 to output first and second left-eye output image signals LL1 and LL2 and first and second right-eye output image signals RR1 and RR2.

The control signal CONT1 provided to the timing controller 100 may include a main clock signal MCLK, a vertical synchronization signal VSYNC, a horizontal synchronization signal HSYNC, a data enable signal DE, etc. The timing controller 100 may generate a gate control signal CONT2 for controlling an operation of the gate driver 300 and a data control signal CONT3 for controlling an operation of the data driver 400 using the control signal CONT1. The gate control signal CONT2 may be provided to the gate driver 300, and the data control signal CONT3 may be provided to the data driver 400.

The timing controller 100 may generate a gamma selection control signal CONT4 in response to a three-dimensional (3D) enable signal 3D_EN. The gamma selection control signal CONT4 may be supplied to the gamma voltage generator 500.

The gamma voltage generator 500 may output 3D gamma reference voltages VGMA1 through VGMA18 in response to a high level of the gamma selection control signal CONT4. Although not shown in FIG. 1, when a two-dimensional (2D) enable signal is supplied to the timing controller 100, the gamma voltage generator 500 may output a 2D gamma reference voltage having a magnitude different from those of the 3D gamma reference voltages VGMA1 through VGMA18 in response to a low level of the gamma selection control signal CONT4.

The gate driver 300 may be connected with the gate lines GL1 through GLh of the display panel 200 and may supply a gate voltage to the gate lines GL1 through GLh. The gate driver 300 may generate gate signals including a gate on voltage VON and a gate off voltage VOFF based on the gate control signal CONT2 provided from the timing controller 100. The gate driver 300 may sequentially output the gate voltages to the gate lines GL1 through GLh. The gate control signal CONT2 may include a vertical start signal STV indicating a start of an operation of the gate driver 300, a gate clock signal GCLK controlling an output time of a gate voltage, an output enable signal OE controlling a pulse width of a gate voltage, and the like.

The gate driver 300 may be integrated on the display panel 200 using an Amorphous Silicon Gate (ASG) technique, such that it is not formed of a separate integrated circuit. A circuit area and a number of parts of the gate driver 300 may be reduced by using a System On Glass (SOG) technique in which the gate driver 300 is formed on an amorphous silicon glass substrate.

The data driver 400 may receive the first and second left-eye output image signals LL1 and LL2 and the first and second right-eye output image signals RR1 and RR2 from the timing controller 100. The data driver 400 may drive the data lines DL1 through DLi with data voltages corresponding to the first and second left-eye output image signals LL1 and LL2 and the first and second right-eye output image signals RR1 and RR2 in response to the data control signal CONT3. The data driver 400 may convert the first and second left-eye output image signals LL1 and LL2 and the first and second right-eye output image signals RR1 and RR2 into driving voltages based on the 3D gamma reference voltages VGMA1 through VGMA18 provided from the gamma voltage generator 500. The data control signal CONT3 may include a horizontal start signal STH indicating a start of an operation of the data driver 400, an inversion signal POL controlling polarities of left-eye and right-eye data voltages, and a load signal TP controlling an output time of the left-eye and right-eye data voltages.

The shutter glasses 600 may be used to observe an image displayed at the display panel 200. The shutter glasses 600 may include a left-eye shutter (not shown) and a right-eye shutter (not shown). The shutter glasses 600 may sequentially drive the left-eye shutter and the right-eye shutter in response to a 3D synchronization signal 3D_Sync. If a user wears the shutter glasses 600, the user may see a 3D image displayed at the display panel 200 via the left-eye shutter and the right-eye shutter which are sequentially driven.

Figure 2:
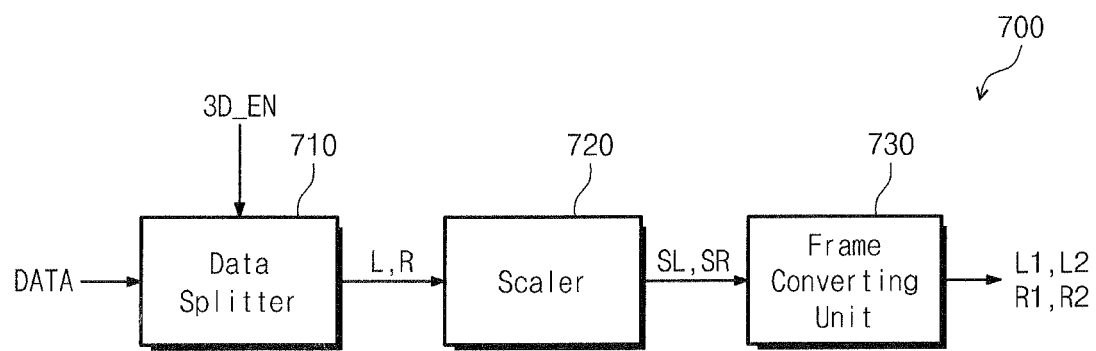
FIG. 2 is a block diagram illustrating a frame rate convertor in FIG. 1, according to an exemplary embodiment of the inventive concept.

FIG. 2 is a block diagram illustrating the frame rate convertor 700 in FIG. 1, according to an exemplary embodiment of the inventive concept.

Referring to FIG. 2, the frame rate convertor 700 may include a data splitter 710, a scaler 720, and a frame converting unit 730.

The data splitter 710 may receive an input image signal DATA, and may split the input image signal DATA which is a 2D image signal into a left-eye signal L and a right-eye signal R in response to a 3D enable signal 3D_EN. The left-eye signal L and the right-eye signal R may be provided to the scaler 720.

The scaler 720 may control a resolution of each of the left-eye signal L and the right-eye signal R to be suitable for a resolution of the display panel 200, and may output a left-eye image signal SL and a right-eye image signal SR. The frame converting unit 730 may generate a first left-eye image signal L1 and a second left-eye image signal L2 in response to the left-eye image signal SL from the scaler 720. Further, the frame converting unit 730 may generate a first right-eye image signal R1 and a second right-eye image signal R2 in response to the right-eye image signal SR from the scaler 720. Accordingly, the frame converting unit 730 may sequentially output the first left-eye image signal L1, the second left-eye image signal L2, the first right-eye image signal R1, and the second right-eye image signal R2. On the other hand, the frame converting unit 730 may sequentially output the first right-eye image signal R1, the second right-eye image signal R2, the first left-eye image signal L1 and the second left-eye image signal L2.

Figure 3:
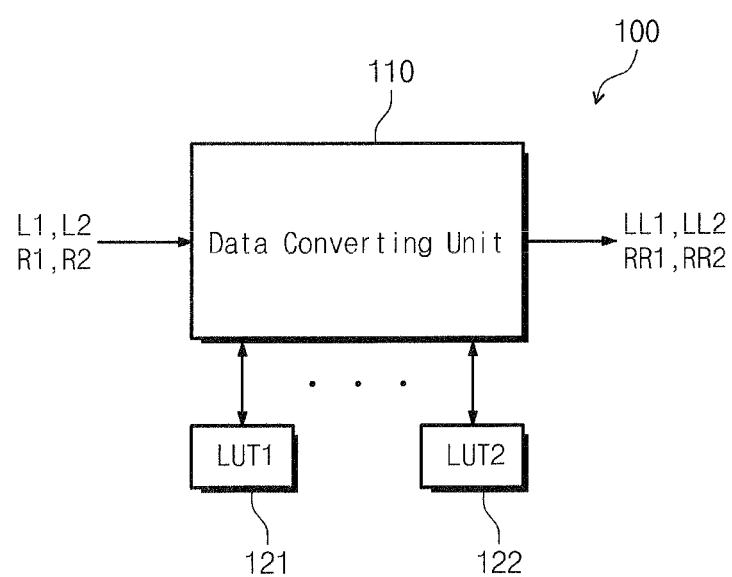
FIG. 3 is a block diagram illustrating a timing controller in FIG. 1, according to an exemplary embodiment of the inventive concept.

FIG. 3 is a block diagram illustrating the timing controller 100 in FIG. 1, according to an exemplary embodiment of the inventive concept.

Referring to FIG. 3, the timing controller 100 may include a data converting unit 110 and first and second lookup tables 121 and 122.

The data converting unit 110 may sequentially receive the first left-eye image signal L1, the second left-eye image signal L2, the first right-eye image signal R1, and the second right-eye image signal R2 from the frame rate convertor 700. The data converting unit 110 may convert the first left-eye image signal L1 into a first left-eye output image signal LL1 using the first lookup table 121. The data converting unit 110 may obtain the first left-eye output image signal LL1 by changing a gray-scale value of the first left-eye image signal L1 according to a row location of the display panel 200 where the first left-eye image signal L1 is to be displayed. At this time, the data converting unit 110 may read out from the first lookup table 121 the first left-eye output image signal LL1 corresponding to the row location of the display panel 200 where the first left-eye image signal L1 and consequently the first left-eye output image signal LL1 are to be displayed.

Like the first left-eye output image signal LL1, the data converting unit 110 may convert a second left-eye image signal L2 into a second left-eye output image signal LL2 using the second lookup table 122 when the second left-eye image signal L2 is received from the frame rate convertor 700. The data converting unit 110 may obtain the second left-eye output image signal LL2 by changing a gray-scale value of the second left-eye image signal L2 according to a row location of the display panel 200 where the second left-eye image signal L2 is to be displayed. At this time, the data converting unit 110 may read out from the second lookup table 122 the second left-eye output image signal LL2 corresponding to the row location of the display panel 200 where the second left-eye image signal L2 and consequently the second left-eye output image signal LL2 are to be displayed.

The data converting unit 110 may convert a first right-eye image signal R1 into a first right-eye output image signal RR1 using the first lookup table 121 when the first right-eye image signal R1 is received from the frame rate convertor 700. The data converting unit 110 may obtain the first right-eye output image signal RR1 by changing a gray-scale value of the first right-eye image signal R1 according to a row location of the display panel 200 where the first right-eye image signal R1 is to be displayed. At this time, the data converting unit 110 may read out from the first lookup table 121 the first right-eye output image signal RR1 corresponding to the row location of the display panel 200 where the first right-eye image signal R1 and consequently the first right-eye output image signal RR1 are to be displayed.

Like the first right-eye output image signal RR1, the data converting unit 110 may convert a second right-eye image signal R2 into a second right-eye output image signal RR2 using the second lookup table 122 when the second right-eye image signal R2 is received from the frame rate convertor 700. The data converting unit 110 may obtain the second right-eye output image signal RR2 by changing a gray-scale value of the second right-eye image signal R2 according to a row location of the display panel 200 where the second right-eye image signal R2 is to be displayed. At this time, the data converting unit 110 may read out from the second lookup table 122 the second right-eye output image signal RR2 corresponding to the row location of the display panel 200 where the second right-eye image signal R2 and consequently the second right-eye output image signal RR2 are to be displayed.

The gate driver 300 illustrated in FIG. 1 may sequentially drive the gate lines GL1 through GLh. A time interval may arise between a point of time when an image signal is displayed at pixels 203 connected with an uppermost gate line, e.g., GL1, of the display panel 200 and a point of time when an image signal is displayed at pixels 203 connected with a lowermost gate line, e.g., GLh, of the display panel 200.

The first and second left-eye output image signals LL1 and LL2 may have different gray-scale values and the first and second right-eye output image signals RR1 and RR2 may have different gray-scale values. This may be done to obtain an effect that an entire frame of an image signal is displayed at the display panel 200 at the same time. Gray-scale values of the first and second left-eye output image signals LL1 and LL2 and the first and second right-eye output image signals RR1 and RR2 may differentiate according to display locations of the display panel 200.

Figure 4:
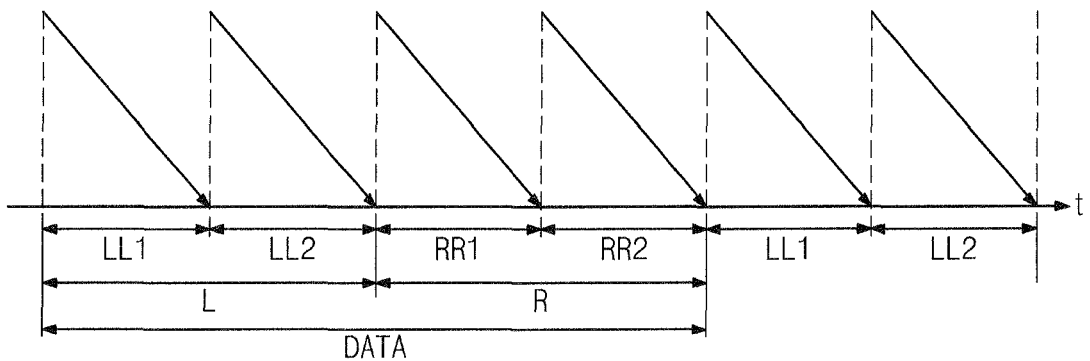
FIG. 4 is a diagram for describing an order of first and second left-eye output image signals and first and second right-eye output image signals output from a data converting unit in FIG. 3, according to an exemplary embodiment of the inventive concept.

FIG. 4 is a diagram for describing an order of the first and second left-eye output image signals LL1 and LL2 and the first and second right-eye output image signals RR1 and RR2 output from the data converting unit 110 in FIG. 3, according to an exemplary embodiment of the inventive concept.

Referring to FIG. 4, an input image signal DATA may be split into a left-eye signal L and a right-eye signal R by the data splitter 710 in FIG. 2. The frame converting unit 730 of FIG. 2 may convert the left-eye signal L into first and second left-eye image signals L1 and L2 and the right-eye signal R into first and second right-eye image signals R1 and R2. The data converting unit 110 in FIG. 3 may convert the first and second left-eye image signals L1 and L2 into first and second left-eye output image signals LL1 and LL2 and the first and second right-eye image signals R1 and R2 into first and second right-eye output image signals RR1 and RR2. In other words, one frame of input image data DATA may be converted into the first and second left-eye output image signals LL1 and LL2 and the first and second right-eye output image signals RR1 and RR2.

Figure 5:
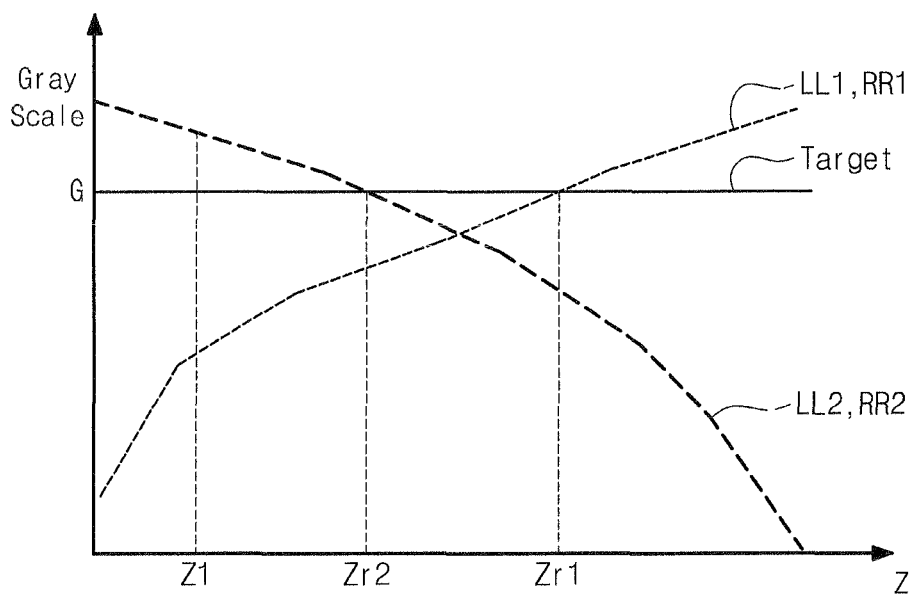
FIG. 5 is a graph illustrating variations of gray-scale values of first and second left-eye output image signals and first and second right-eye output image signals at row locations of a display panel, according to an exemplary embodiment of the inventive concept.

FIG. 5 is a graph illustrating variations of gray-scale values of first and second left-eye output image signals LL1 and LL2 and first and second right-eye output image signals RR1 and RR2 according to a row location of the display panel 200, according to an exemplary embodiment of the inventive concept. In FIG. 5, a horizontal axis may indicate a vertical location of the display panel 200, in other words, a row location Z, and a vertical axis may indicate a gray scale.

Referring to FIG. 5, a gray scale of the first left-eye output image signal LL1 may be determined according to a gray scale of a left-eye signal L and a row location of a pixel 203 to be displayed within the display panel 200. As a row location Z increases, in other words, as the row location Z gets closer to a lower part of a screen of the display panel 200, a gray scale of the first left-eye output image signal LL1 may increase, while a gray scale of the second left-eye output image signal LL2 may decrease.

A left-eye signal L to be displayed at a specific row Z1 may be converted into the first left-eye output image signal LL1 and the second left-eye output image signal LL2. The first left-eye output image signal LL1 may be first displayed at the display panel 200, and then the second left-eye output image signal LL2 may be displayed at the display panel 200. In other words, after the first left-eye output image signal LL1 with a gray scale smaller than that of the left-eye signal L is displayed, the second left-eye output image signal LL2 with a gray scale larger than that of the left-eye signal L may be displayed. A gray scale corresponding to the left-eye signal L may be expressed by continuously applying data voltages corresponding to different gray scales to one pixel 203. This may be made to consider a response speed of a pixel 203.

Like the first and second left-eye output image signals LL1 and LL2, gray scales of the first and second right-eye output image signals RR1 and RR2 may be determined according to a gray scale of a right-eye signal R and a row location of a pixel 203 to be displayed within the display panel 200. For example, a right-eye signal R to be displayed at a specific row Z1 may be converted into the first right-eye output image signal RR1 and the second right-eye output image signal RR2, such that the first right-eye output image signal RR1 has a gray scale smaller than that of the second right-eye output image signal RR2.

It is assumed that a gray scale of a left-eye signal L is G as illustrated in FIG. 5. In this case, a gray scale of a first left-eye output image signal LL1 to be displayed at a row higher in place than a first reference row Zr1 of the display panel 200 may have a value smaller than G, and a gray scale of the first left-eye output image signal LL1 to be displayed at a row lower in place than the first reference row Zr1 may have a value larger than G. Likewise, in the event that a gray scale of a right-eye signal R is G, a gray scale of a first right-eye output image signal RR1 to be displayed at a row higher in place than the first reference row Zr1 of the display panel 200 may have a value smaller than G, and a gray scale of the first right-eye output image signal RR1 to be displayed at a row lower in place than the first reference row Zr1 may have a value larger than G. On the other hand, in the event that a gray scale of a left-eye signal L is G, a gray scale of a second left-eye output image signal LL2 to be displayed at a row higher in place than a second reference row Zr2 of the display panel 200 may have a value larger than G, and a gray scale of the second left-eye output image signal LL2 to be displayed at a row lower in place than the second reference row Zr2 may have a value smaller than G. Likewise, in the event that a gray scale of a right-eye signal R is G, a gray scale of a second right-eye output image signal RR2 to be displayed at a row higher in place than the second reference row Zr2 of the display panel 200 may have a value larger than G, and a gray scale of the second right-eye output image signal RR2 to be displayed at a row lower in place than the second reference row Zr2 may have a value smaller than G. Herein, the first and second reference rows Zr1 and Zr2 may be differentiated according to the gray scales of the left and right signals L and R.

Figure 6A:
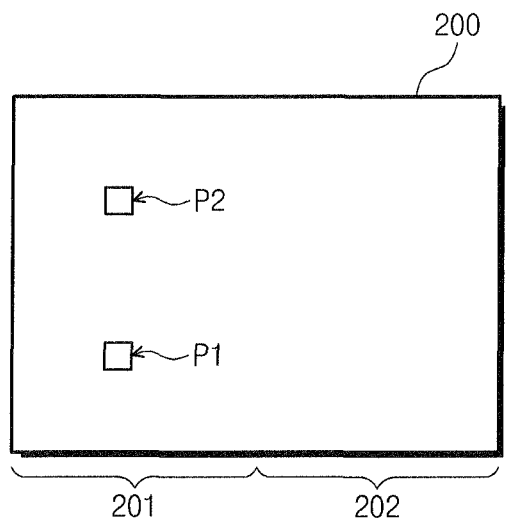
FIGS. 6A and 6B are diagrams for describing a driving method of a display device according to an exemplary embodiment of the inventive concept.
Figure 6B:
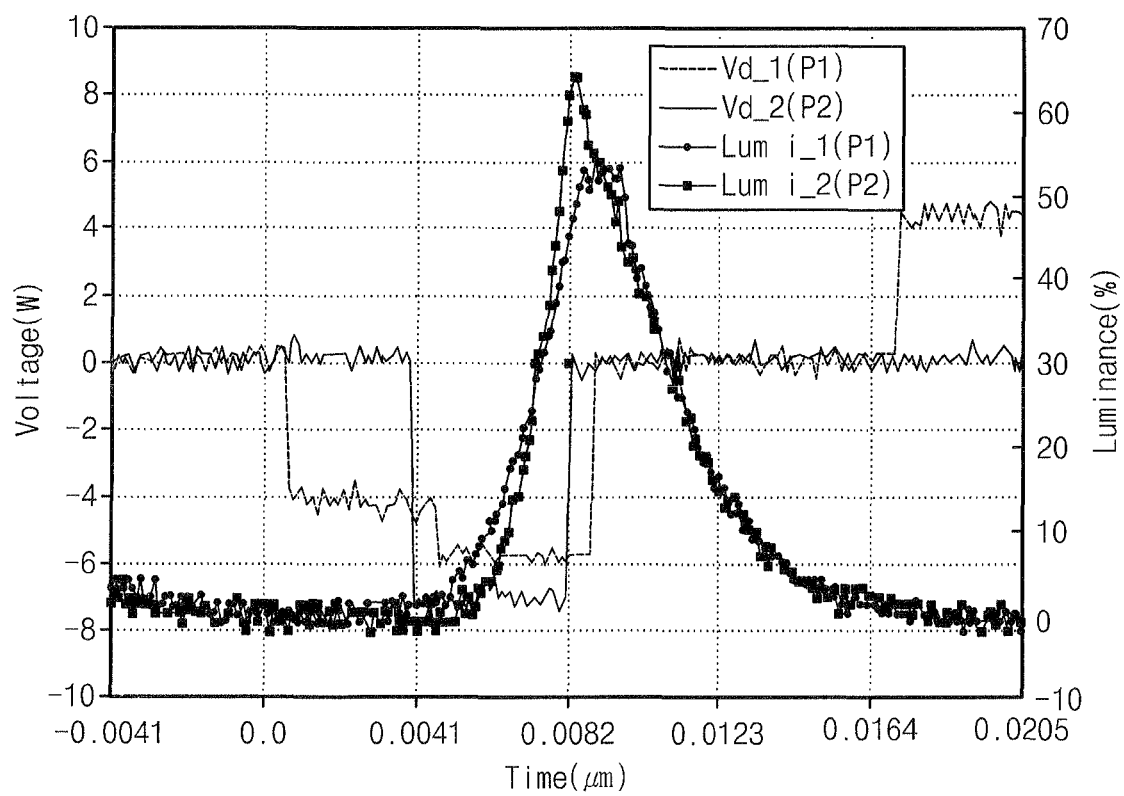

FIGS. 6A and 6B are diagrams for describing a driving method of a display device according to an exemplary embodiment of the inventive concept.

FIG. 6A shows locations of two pixels within the display panel 200.

Referring to FIG. 6A, a display panel 200 may include a left-eye region 201 and a right-eye region 202. First and second left-eye output image signals LL1 and LL2 may be displayed at the left-eye region 201, and first and second right-eye output image signals RR1 and RR2 may be displayed at the right-eye region 202. A first pixel P1 and a second pixel P2 of the display panel 200 may be pixels located at different rows of the display panel 200. For example, the first pixel P1 may be located at a lower part of the display panel 200, and the second pixel P2 may be located at an upper part of the display panel 200. Although not illustrated in detail, the second pixel P2 may be connected with the same data line as the first pixel P1. Further, the second pixel P2 may be connected with a gate line different from that of the first pixel P1. As described in FIG. 1, since gate signals are supplied sequentially to the display panel 200 and pixels 203 receive data voltages in response to the gate signals, the first and second pixels P1 and P2 may receive data voltages at different times. Data voltages corresponding to the first and second left-eye output image signals LL1 and LL2 having different gray scales may be supplied to the first and second pixels P1 and P2 such that the first and second pixels P1 and P2 display images at the same time.

FIG. 6B is a graph of a luminance response curve indicating a luminance variation according to data voltages and times applied to the first and second pixels P1 and P2 in FIG. 6A over time. In FIG. 6B, a horizontal axis may indicate a time, a left-side vertical axis may indicate a data voltage, and a right-side vertical axis may indicate a luminance.

Referring to FIG. 6B, Vd_1 may show a variation of a data voltage supplied to the first pixel P1 according to a time lapse. Vd_2 may show a variation of a data voltage supplied to the second pixel P2 according to a time lapse. After the first pixel P1 receives a data voltage of −4V and a time elapses, a data voltage of −4V may be applied to the second pixel P2.

A first luminance response curve Lum i_1 may indicate a luminance variation of the first pixel P1 according to a time lapse, and a second luminance response curve Lum i_2 may indicate a luminance variation of the second pixel P2 according to a time lapse. The first luminance response curve Lum i_1 may be almost identical to that of the second luminance response curve Lum i_2. In other words, the first and second pixels P1 and P2 may have substantially the same luminance at the same time.

Accordingly, although the two pixels P1 and P2 placed at different locations are driven at different times, they may display images at the same time by controlling levels of the data voltages applied to the two pixels P1 and P2.

Although the data voltages are applied to the pixels P1 and P2 placed at lower and upper parts of the display panel 200 at different times in the case where a plurality of gate lines are sequentially scanned, response speeds between image signals to be displayed by these pixels may coincide, therefore, the quality of a 3D image may be improved.

Further, a decrease in luminance may be prevented because an image signal with a black gray scale is not inserted between a left-eye output image signal LL1/LL2 and a right-eye output image signal RR1/RR2.

Figure 7:
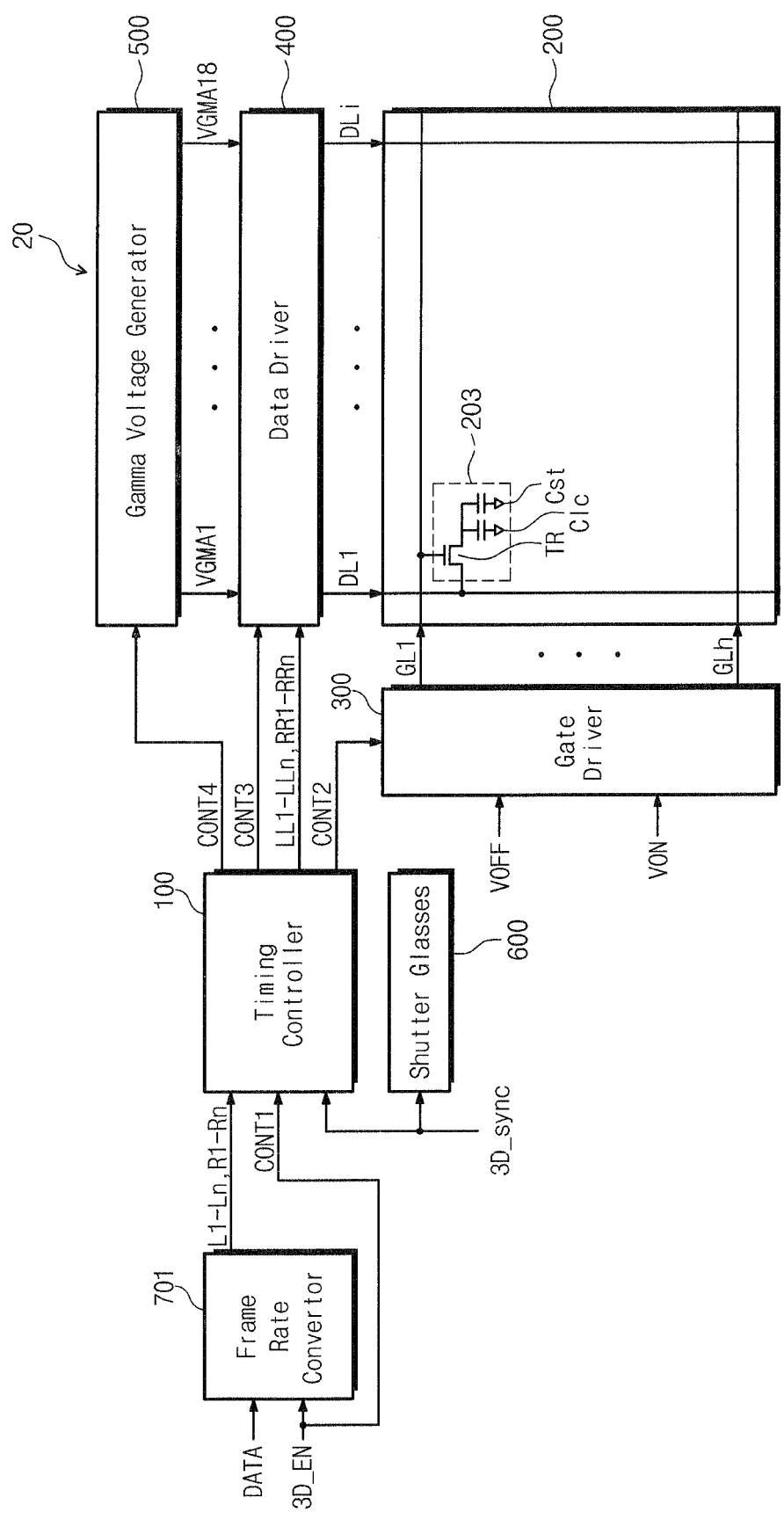
FIG. 7 is a block diagram illustrating a display device according to an exemplary embodiment of the inventive concept.

FIG. 7 is a block diagram illustrating a display device according to an exemplary embodiment of the inventive concept.

Referring to FIG. 7, a display device 20 may include a display panel 200 for displaying images, gate and data drivers 300 and 400 for driving the display panel 200, a gamma voltage generator 500 connected to the data driver 400, a timing controller 100 for controlling the gate driver 300 and the data driver 400, a frame rate convertor 701, and shutter glasses 600. Elements 100, 200, 300, 400, 500, and 600 in FIG. 7 may be substantially identical to those in FIG. 1, and thus a description thereof is omitted.

The frame rate convertor 701 may output N left-eye image signals L1 through Ln and N right-eye image signals R1 through Rn based on an input image signal DATA from a video system (not shown) to coincide with a frame rate of the display panel 200.

Figure 8:
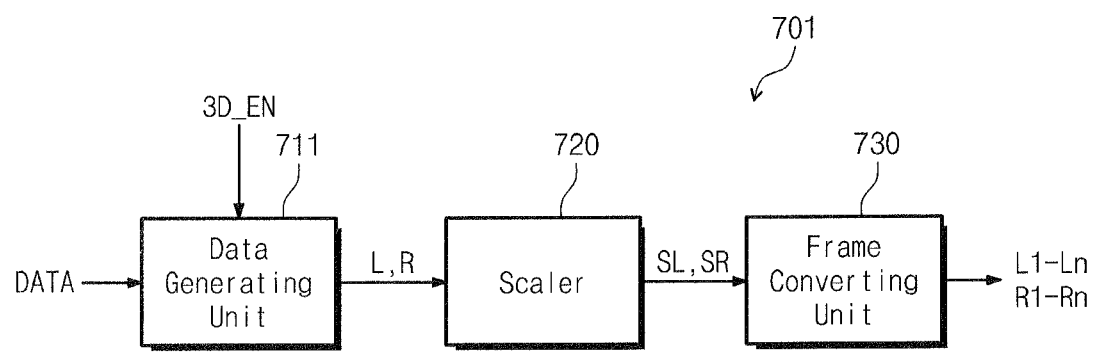
FIG. 8 is a block diagram illustrating a frame rate convertor in FIG. 7, according to an exemplary embodiment of the inventive concept.

FIG. 8 is a block diagram illustrating the frame rate convertor 701 in FIG. 7, according to an exemplary embodiment of the inventive concept.

Referring to FIG. 8, the frame rate convertor 701 may include a data generating unit 711, a scaler 720, and a frame converting unit 730. The scaler 720 and the frame converting unit 730 in FIG. 8 may be substantially identical to those in FIG. 2, and thus a detailed description thereof is omitted.

The data generating unit 711 may generate a left-eye signal L and a right-eye signal R based on the input image signal DATA. The left-eye signal L and the right-eye signal R may be supplied to the scaler 720.

The scaler 720 may control a resolution of each of the left-eye signal L and the right-eye signal R to be suitable for a resolution of the display panel 200, and may output a left-eye image signal SL and a right-eye image signal SR. The frame converting unit 730 may generate N left-eye image signals L1 through Ln in response to the left-eye image signal SL from the scaler 720. The frame converting unit 730 may generate N right-eye image signals R1 through Rn in response to the right-eye image signal SR from the scaler 720. Accordingly, the frame converting unit 730 may sequentially output the left-eye image signals L1 through Ln and the right-eye image signals R1 through Rn. On the other hand, the frame converting unit 730 may sequentially output the right-eye image signals R1 through Rn and the left-eye image signals L1 through Ln.

The timing controller 100 illustrated in FIG. 7 may convert the N left-eye image signals L1 through Ln into N left-eye output image signals LL1 through LLn and the N right-eye image signals R1 through Rn into N right-eye output image signals RR1 through RRn. The N left-eye output image signals LL1 through LLn and the N right-eye output image signals RR1 through RRn may be supplied to the data driver 400.

Figure 9:
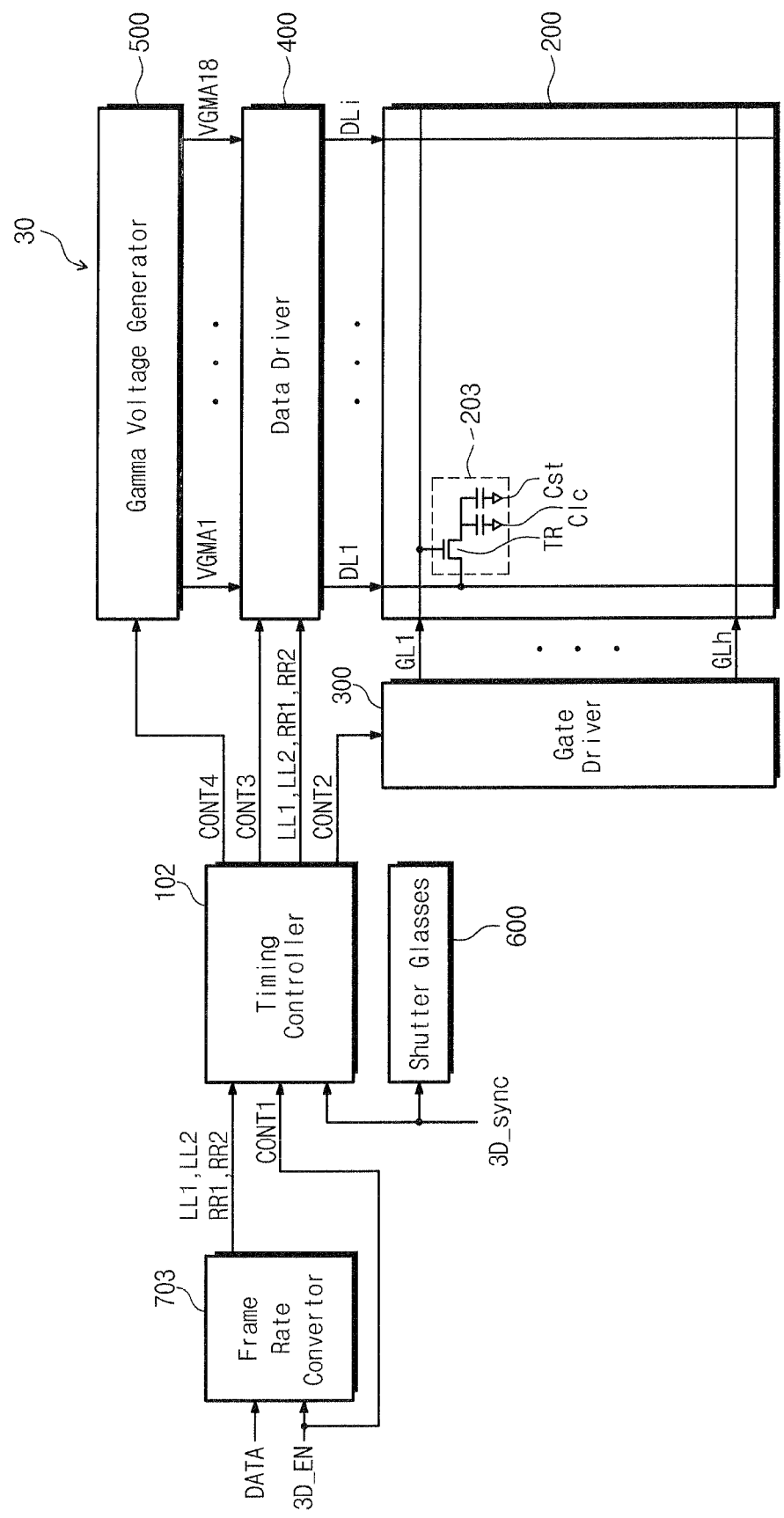
FIG. 9 is a block diagram illustrating a display device according to an exemplary embodiment of the inventive concept.

FIG. 9 is a block diagram illustrating a display device according to an exemplary embodiment of the inventive concept.

Referring to FIG. 9, a display device 30 may include a display panel 200 for displaying images, gate and data drivers 300 and 400 for driving the display panel 200, a gamma voltage generator 500 connected to the data driver 400, a timing controller 102 for controlling the gate driver 300 and the data driver 400, a frame rate convertor 703, and shutter glasses 600. Elements 200, 300, 400, 500, and 600 in FIG. 9 may be substantially identical to those in FIG. 1, and thus a description thereof is omitted.

The frame rate convertor 703 may divide an input image signal DATA provided from a video system (not shown) into an image signal for the left eye and an image signal for the right eye, and may generate and output first and second left-eye output image signals LL1 and LL2 and first and second right-eye output image signals RR1 and RR2 which have the same frame rate as that of the display panel 200.

In the event that a frame rate of the input image signal DATA is 60 Hz and the frame rate of the display panel 200 is 240 Hz, the frame rate convertor 703 may split the input image signal DATA with a frequency of 60 Hz into a left-eye signal L and a right-eye signal R. The frame rate convertor 703 may generate the first and second left-eye output image signals LL1 and LL2 with a frame rate of 240 Hz based on the left-eye signal L and the first and second right-eye output image signals RR1 and RR2 with a frame rate of 240 Hz based on the right-eye signal R.

A frequency of each of the first and second left-eye output image signals LL1 and LL2 and the first and second right-eye output image signals RR1 and RR2 output from the frame rate convertor 703 may be 240 Hz. But, the first and second left-eye output image signals LL1 and LL2 and the first and second right-eye output image signals RR1 and RR2 output from the frame rate convertor 703 can be generated to have a frequency (e.g., 120 Hz, 360 Hz, etc.) other than 240 Hz.

The timing controller 102 may receive the first and second left-eye output image signals LL1 and LL2 and the first and second right-eye output image signals RR1 and RR2 output from the frame rate convertor 703 and a control signal CONT1 provided from an external device. The timing controller 102 may provide the data driver 400 with the first and second left-eye output image signals LL1 and LL2 and the first and second right-eye output image signals RR1 and RR2 in response to the control signal CONT1.

The control signal CONT1 provided to the timing controller 102 may include a main clock signal MCLK, a vertical synchronization signal VSYNC, a horizontal synchronization signal HSYNC, a data enable signal DE, etc. The timing controller 102 may generate a gate control signal CONT2 for controlling an operation of the gate driver 300 and a data control signal CONT3 for controlling an operation of the data driver 400 using the control signal CONT1. The gate control signal CONT2 may be provided to the gate driver 300, and the data control signal CONT3 may be provided to the data driver 400.

The timing controller 102 may generate a gamma selection control signal CONT4 in response to a 3D enable signal 3D_EN. The gamma selection control signal CONT4 may be supplied to the gamma voltage generator 150.

Figure 10:
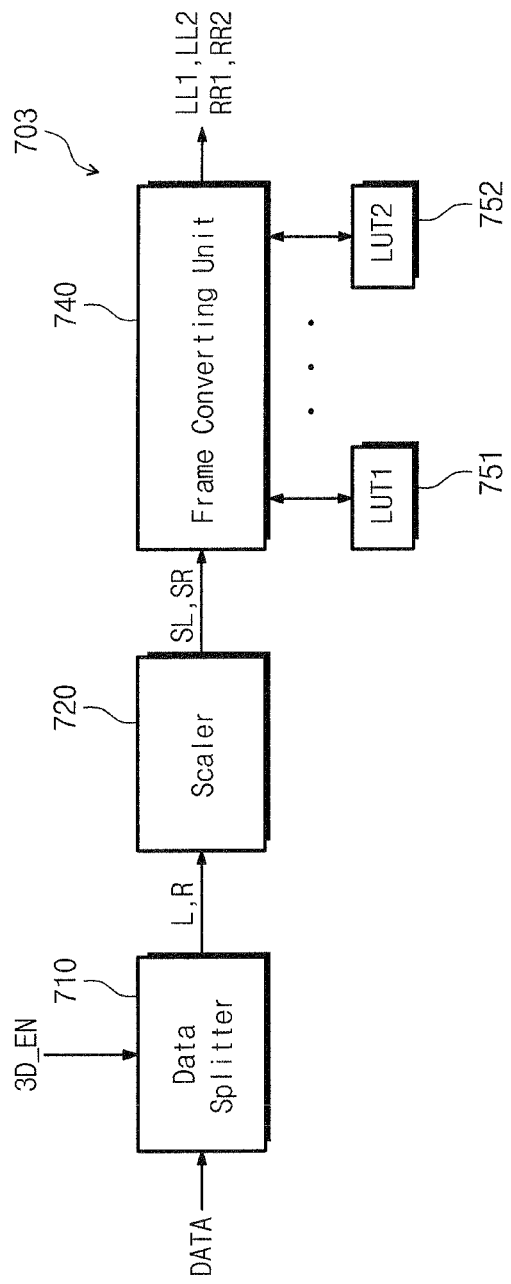
FIG. 10 is a block diagram illustrating a frame rate convertor in FIG. 9, according to an exemplary embodiment of the inventive concept.

FIG. 10 is a block diagram illustrating the frame rate convertor 703 in FIG. 9, according to an exemplary embodiment of the inventive concept.

Referring to FIG. 10, the frame rate convertor 703 may include a data splitter 710, a scaler 720, a frame converting unit 740, and first and second lookup tables 751 and 752. The data splitter 710 and the scaler 720 may be substantially identical to those in FIG. 2, and thus a description thereof is omitted. Further, the first and second lookup tables 751 and 752 may be substantially identical to those in FIG. 3, and thus a description thereof is omitted.

The frame converting unit 740 may generate the first left-eye output image signal LL1 using a left-eye image signal SL from the scaler 720 and the first lookup table 751. For example, the frame converting unit 740 may access the first lookup table 751 using a gray scale of the left-eye image signal SL and a row location of the left-eye image signal SL in the display panel 200 to generate and output the first left-eye output image signal LL1.

Like the first left-eye output image signal LL1, the frame converting unit 740 may access the second lookup table 752 using a gray scale of the left-eye image signal SL and the row location of the left-eye image signal SL in the display panel 200 to generate and output the second left-eye output image signal LL2.

Likewise, the frame converting unit 740 may access the first lookup table 751 using a gray scale of a right-eye image signal SR and a row location of the right-eye image signal SR in the display panel 200 to generate and output the first right-eye output image signal RR1. Further, the frame converting unit 740 may access the second lookup table 752 using the gray scale of the right-eye image signal SR and the row location of the right-eye image signal SR in the display panel 200 to generate and output the second right-eye output image signal RR2.

As described in relation to FIGS. 3 and 4, gray scales of the first and second left-eye output image signals LL1 and LL2 and the first and second right-eye output image signals RR1 and RR2 may be determined according to a row location to be displayed at the display panel 200, such that certain pixels 203 may display images at the same time.

Further, since the first and second left-eye output image signals LL1 and LL2 are used to display the left-eye signal L, a luminance of an image output to a pixel 203 of the display panel 200 by the continuous first and second left-eye output image signals LL1 and LL2 may be identical to that of the left-eye signal L.

Gray scales of the first and second left-eye output image signals LL1 (L,z) and LL2 (L,z) and the first and second right-eye output image signals RR1 (R,z) and RR2 (R,z) may be identical to those described in relation to FIG. 5.

In view of the above description, like the display device 10 in FIG. 1, image display times of the pixels 203 may coincide by compensating gray scales according to row locations where the first and second left-eye output image signals LL1 (L,z) and LL2 (L,z) and the first and second right-eye output image signals RR1 (R,z) and RR2 (R,z) are to be displayed on the display panel 200. Accordingly, the mixing of a left-eye image and a right-eye image may be prevented. Further, a decrease in luminance may be prevented because an image signal with a black gray scale is not inserted between the left-eye output image signals LL1/LL2 and the right-eye output image signals RR1/RR2.

Figure 11:
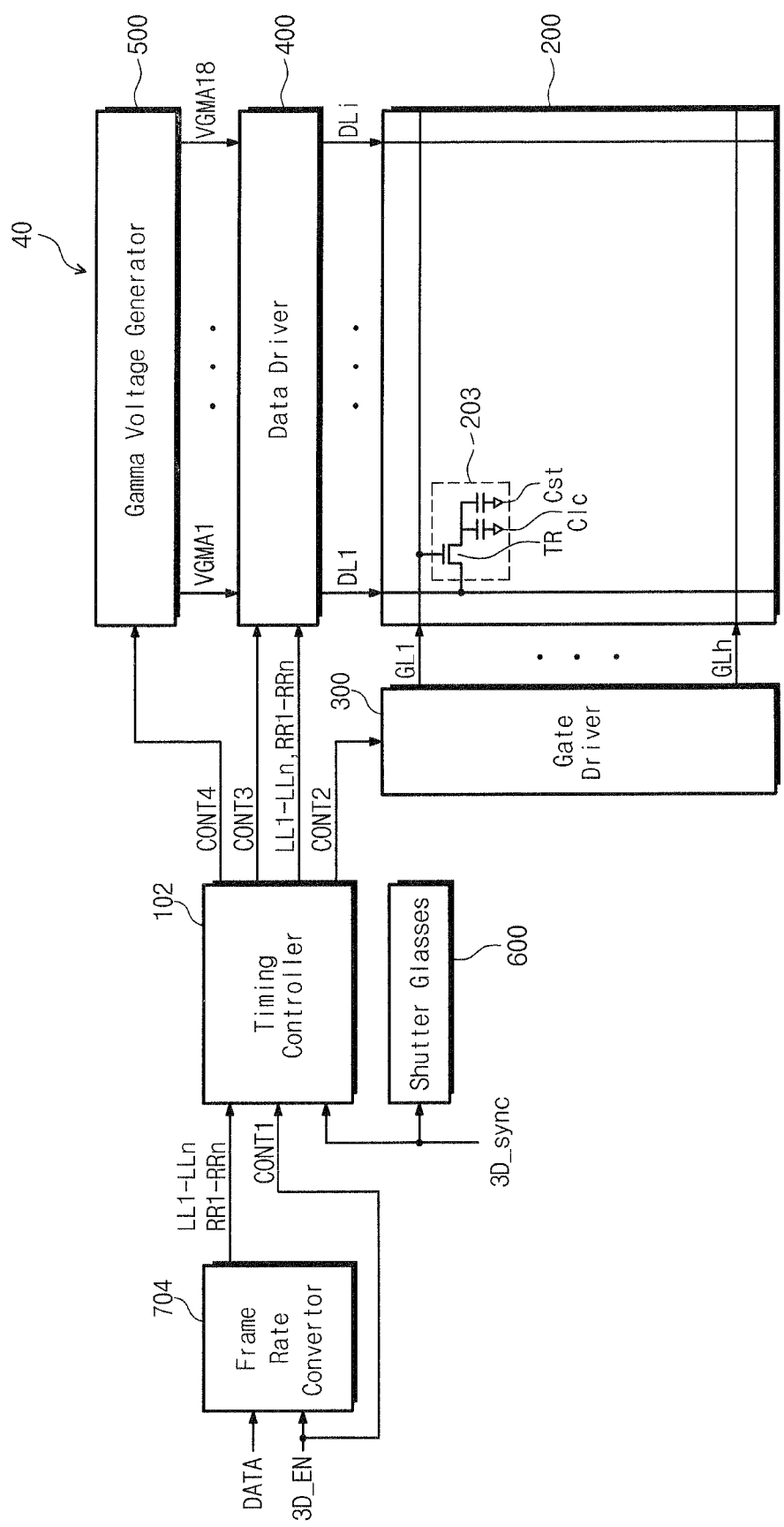
FIG. 11 is a block diagram illustrating a display device according to an exemplary embodiment of the inventive concept.

FIG. 11 is a block diagram illustrating a display device according to an exemplary embodiment of the inventive concept.

Referring to FIG. 11, a display device 40 may include a display panel 200 for displaying images, gate and data drivers 300 and 400 for driving the display panel 200, a gamma voltage generator 500 connected to the data driver 400, a timing controller 102 for controlling the gate driver 300 and the data driver 400, a frame rate convertor 704, and shutter glasses 600. The elements 102, 200, 300, 400, 500, and 600 in FIG. 11 may be substantially identical to those in FIG. 9, and thus a detailed description thereof is omitted.

The frame rate convertor 704 may output N left-eye image signals LL1 through LLn and N right-eye image signals RR1 through RRn based on an image signal DATA input from a video system (not shown) to coincide with a frame rate of the display panel 200.

Figure 12:
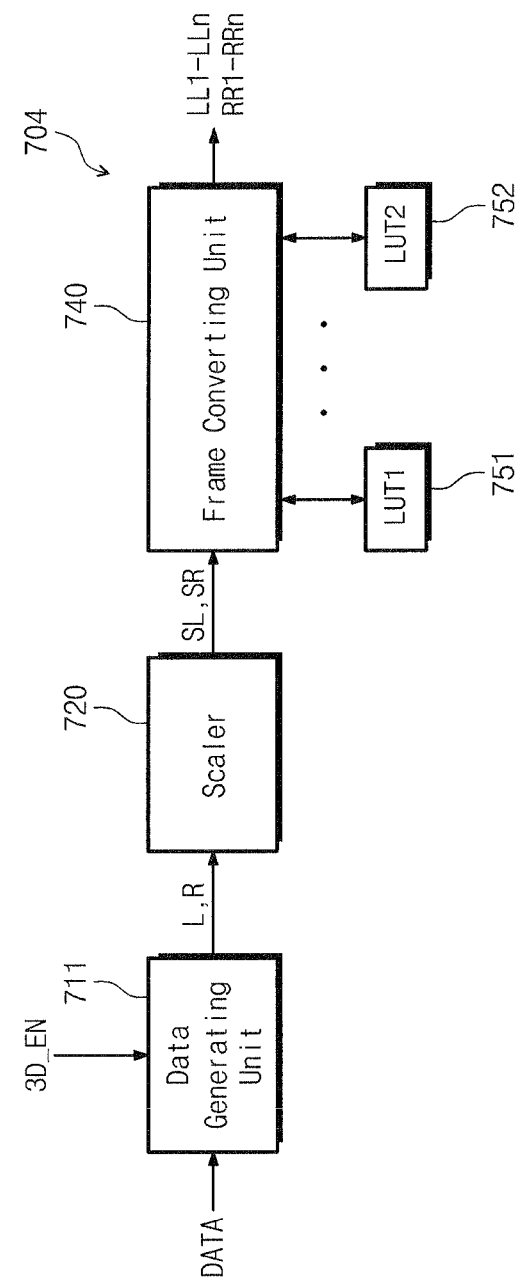
FIG. 12 is a block diagram illustrating a frame rate convertor in FIG. 11, according to an exemplary embodiment of the inventive concept.

FIG. 12 is a block diagram illustrating the frame rate convertor 704 in FIG. 11, according to an exemplary embodiment of the inventive concept.

Referring to FIG. 12, the frame rate convertor 704 may include a data generating unit 711, a scaler 720, and a frame converting unit 740. The scaler 720 and the frame converting unit 740 may be substantially identical to those in FIG. 9, and thus a description thereof is omitted.

The data generating unit 711 may generate a left-eye signal L and a right-eye signal R based on the input image signal DATA. The data generating unit 711 may provide the left-eye signal L and the right-eye signal R to the scaler 720.

Although the exemplary embodiments of the present inventive concept have been described, it is understood that the present inventive concept should not be limited to these exemplary embodiments but various changes and modifications can be made by one of ordinary skill in the art within the spirit and scope of the present inventive concept as hereinafter claimed.

What is claimed is:

1. A display device, comprising:
a display panel including a plurality of pixels, wherein the pixels are arranged in a plurality of rows, the rows being sequentially arranged from a top part to a lower part of a screen of the display panel;
a frame rate convertor configured to separate an input image signal into a left-eye image signal and a right-eye image signal, output the left-eye image signal as first and second left-eye image signals and output the right-eye image signal as first and second right-eye image signals;
a timing controller configured to convert the first left-eye image signal into a first left-eye output image signal according to a row location of the pixel within the display panel where the first left-eye image signal is to be displayed, convert the second left-eye image signal into a second left-eye output image signal according to a row location of the pixel within the display panel where the second left-eye image signal is to be displayed, convert the first right-eye image signal into a first right-eye output image signal according to a location of the display panel where the first right-eye image signal is to be displayed and convert the second right-eye image signal into a second right-eye output image signal according to a location of the display panel where the second right-eye image signal is to be displayed; and
a data driver configured to drive the pixels in response to the first and second left-eye output image signals and the first and second right-eye output image signals,
wherein as a row location of the display panel where the left-eye image signal is to be displayed gets closer to the lower part of the screen of the display panel, a gray scale value of the first left-eye output image signal increases and a gray scale value of the second left-eye output image signal decreases, and as the gray scale value of the first left-eye output image signal increases and the gray scale value of the second left-eye output image signal decreases, the gray scale values of the first left-eye output image signal and the second left-eye output image signal intersect each other and are lower than a target gray scale value of the left-eye image signal when they intersect, and
after the gray scale values of the first left-eye output image signal and the second left-eye output image signal intersect each other, the gray scale value of the first left-eye output image signal becomes greater than the target gray scale value of the left-eye image signal and the gray scale value of the second left-eye output image signal remains lower than the target gray scale value of the left-eye image signal.

2. The display device of claim 1, wherein the timing controller converts the first and second left-eye image signals into the first and second left-eye output image signals by changing gray scale values of the first and second left-eye image signals to respectively correspond to the locations of the display panel where the first and second left-eye image signals are to be displayed, and converts the first and second right-eye image signals into the first and second right-eye output image signals by changing gray scale values of the first and second right-eye image signals to respectively correspond to the locations of the display panel where the first and second right-eye image signals are to be displayed.

3. The display device of claim 2, wherein the timing controller comprises:
a first lookup table configured to store the gray scale values corresponding to the locations of the display panel where the first left-eye and right-eye image signals are to be displayed;
a second lookup table configured to store the gray scale values corresponding to the locations of the display panel where the second left-eye and right-eye image signals are to be displayed; and
a data converting unit configured to convert the first and second left-eye image signals into the first and second left-eye output image signals and the first and second right-eye image signals into the first and second right-eye output image signals by using the first and second lookup tables, wherein the data converting unit includes an input to receive the first and second left-eye image signals and the first and second right-eye image signals, an output to send the first and second left-eye output image signals and the first and second right-eye output image signals and connections to the first and second lookup tables to access data therein.

4. The display device of claim 2, wherein the gray scale values of the first left-eye and right-eye image signals are smaller than a gray scale value of the input image signal when the location of the display panel where the first left-eye and right-eye signals are to be displayed is a higher row than a first reference row, and
the gray scale values of the first left-eye and right-eye image signals are larger than the gray scale value of the input image signal when the location of the display panel where the first left-eye and right-eye signals are to be displayed is a lower row than the first reference row.

5. The display device of claim 2, wherein the gray scale values of the second left-eye and right-eye image signals are larger than a gray scale value of the input image signal when the location of the display panel where the second left-eye and right-eye signals are to be displayed is a higher row than a second reference row, and
the gray scales of the second left-eye and right-eye image signals are smaller than the gray scale of the input image signal when the location of the display panel where the second left-eye and right-eye signals are to be displayed is a lower row than the second reference row.

6. The display device of claim 1, wherein the frame rate convertor separates the input image signal into a left-eye signal and a right-eye signal and performs a resolution-based adjustment to generate the left-eye image signal and the right-eye image signal.

7. The display device of claim 1, wherein a frequency of each of the first and second left-eye image signals and the first and second right-eye image signals output from the frame rate convertor circuit is higher than a frequency of the input image signal.

8. The display device of claim 7, wherein the frequency of each of the first and second left-eye image signals and the first and second right-eye image signals output from the frame rate convertor is four times higher than the frequency of the input image signal.

9. A display device, comprising:
a display panel including a plurality of pixels, wherein the pixels are arranged in a plurality of rows, the rows being sequentially arranged from a top part to a lower part of a screen of the display panel;
a frame rate convertor configured to convert an input image signal into first and second left-eye output image signals and first and second right-eye output image signals according to locations of the display panel where the input image signal is to be displayed; and
a data driver configured to drive the pixels in response to the first and second left-eye output image signals and the first and second right-eye output image signals,
wherein the frame rate converter converts the input image signal into the first left-eye output image signal by selecting the first left-eye output image signal from a first lookup table on the basis that the first left-eye output image signal corresponds to a location of the display panel where the input image signal is to be displayed,
wherein as a row location of the display panel where the input image signal is to be displayed gets closer to the lower part of the screen of the display panel, a gray scale value of the first left-eye output image signal increases and a gray scale value of the second left-eye output image signal decreases, and as the gray scale value of the first left-eye output image signal increases and the gray scale value of the second left-eye output image signal decreases, the gray scale values of the first left-eye output image signal and the second left-eye output image signal intersect each other and are lower than a target gray scale value of the left-eye image signal when they intersect, and
after the gray scale values of the first left-eye output image signal and the second left-eye output image signal intersect each other, the gray scale value of the first left-eye output image signal becomes greater than the target gray scale value of the left-eye image signal and the gray scale value of the second left-eye output image signal remains lower than the target gray scale value of the left-eye image signal.

10. The display device of claim 9, wherein the frame rate convertor converts the input image signal into the first and second left-eye output image signals and the first and second right-eye output image signals by using gray scale values of the input image signal corresponding to rows of the display panel where the input image signal is to be displayed.

11. The display device of claim 10, wherein the rows of the display panel increase in a first direction, and the gray scale values of the input image signal corresponding to the first left-eye and right-eye output image signals increase as the rows increase.

12. The display device of claim 10, wherein the rows of the display panel increase in a first direction, and the gray scale values of the input image signal corresponding to the second left-eye and right-eye output image signals decrease as the rows increase.

13. The display device of claim 9, wherein the frame rate convertor comprises:
a data splitting unit configured to convert the input image signal into a left-eye signal and a right-eye signal, wherein the data splitting unit includes an input to receive the input image signal and an output to send the left-eye signal and the right-eye signal;
a scaler configured to convert the left-eye and right-eye signals into left-eye and right-eye image signals depending on a resolution of the display panel; and
a frame converting unit configured to convert the left-eye image signal into the first and second left-eye output image signals by using gray scale values of the left-eye image signal corresponding to a location of the display panel where the left-eye image signal is to be displayed and the right-eye image signal into the first and second right-eye output image signals by using gray scale values of the right-eye image signal corresponding to a location of the display panel where the right-eye image signal is to be displayed, wherein the frame converting unit includes an input to receive the left-eye image signal and the right-eye image signal, an output to send the first and second left-eye output image signals and the first and second right-eye output image signals and connections to the first lookup table and a second lookup table to obtain data therefrom.

14. The display device of claim 13, wherein the frame rate convertor further comprises:
the first lookup table configured to store the gray scale value of the location of the display panel where the left-eye image signal is to be displayed for use in generating the first left-eye output image signal and the gray scale value of the location of the display panel where the right-eye image signal is to be displayed for use in generating the first right-eye output image signal; and
the second lookup table configured to store the gray scale value of the location of the display panel where the left-eye image signal is to be displayed for use in generating the second left-eye output image signal and the gray scale value of the location of the display panel where the right-eye image signal is to be displayed for use in generating the second right-eye output image signal, and
wherein the frame converting unit converts the left-eye image signal into the first and second left-eye output image signals and the right-eye image signal into the first and second right-eye output image signals by using the first and second lookup tables.

15. The display device of claim 9, wherein a frequency of each of the first and second left-eye output image signals and the first and second right-eye output image signals output from the frame rate convertor is higher than a frequency of the input image signal.

16. The display device of claim 15, wherein the frequency of each of the first and second left-eye output image signals and the first and second right-eye output image signals output from the frame rate convertor circuit is four times higher than the frequency of the input image signal.

17. The display device of claim 9, wherein the frame rate convertor sequentially outputs the first and second left-eye output image signals and the first and second right-eye output image signals in response to the input image signal.

18. The display device of claim 9, wherein the frame rate convertor sequentially outputs the first and second right-eye output image signals and the first and second left-eye output image signals in response to the input image signal.

19. A display device, comprising:
- a display panel including a plurality of pixels, wherein the pixels are arranged in a plurality of rows, the rows being sequentially arranged from a top part to a lower part of a screen of the display panel;
- a frame rate convertor configured to receive an image data signal, split the image data signal into left and right-eye signals in response to a three-dimensional (3D) enable signal, adjust the left and right-eye signals according to a display resolution, in response to the adjusted left-eye signal, generate first and second left-eye image signals and, in response to the adjusted right-eye signal, generate first and second right-eye image signals; and
- a timing controller configured to convert the first and second left-eye image signals into first and second left-eye output image signals and the first and second right-eye image signals into first and second right-eye output image signals by using differing gray scale values of the image data signal,
- wherein the timing controller converts the first left-eye image signal into the first left-eye output image signal by selecting the first left-eye output image signal from a first lookup table on the basis that the first left-eye output image signal corresponds to a location of a display panel where the first left-eye image signal is to be displayed,
- wherein as a row location of the display panel where the left-eye signal is to be displayed gets closer to the lower part of the screen of the display panel, a gray scale of the first left-eye output image signal increases and a gray scale of the second left-eye output image signal decreases, and as the gray scale of the first left-eye output image signal increases and the gray scale of the second left-eye output image signal decreases, the gray scales of the first left-eye output image signal and the second left-eye output image signal intersect each other and are lower than a target gray scale of the left-eye image signal when they intersect, and
- after the gray scales of the first left-eye output image signal and the second left-eye output image signal intersect each other, the gray scale of the first left-eye output image signal becomes greater than the target gray scale of the left-eye image signal and the gray scale of the second left-eye output image signal remains lower than the target gray scale of the left-eye image signal.

* * * * *

UNITED STATES PATENT AND TRADEMARK OFFICE
CERTIFICATE OF CORRECTION

PATENT NO. : 9,615,077 B2
APPLICATION NO. : 13/413985
DATED : April 4, 2017
INVENTOR(S) : JangKun Song Page 1 of 1

It is certified that error appears in the above-identified patent and that said Letters Patent is hereby corrected as shown below:

Item (73):
Add as Assignee: SUNGKYUNKWAN UNIVERSITY FOUNDATION FOR CORPORATE

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*